US012244690B2

(12) United States Patent
Rezaei et al.

(10) Patent No.: US 12,244,690 B2
(45) Date of Patent: Mar. 4, 2025

(54) ONLINE SECRET ENCRYPTION

(71) Applicant: Visa International Service Association, San Francisco, CA (US)

(72) Inventors: Fahimeh Rezaei, Mountain View, CA (US); Marc Kekicheff, San Francisco, CA (US); Sergey Smirnoff, San Francisco, CA (US); Philippe Martin, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 204 days.

(21) Appl. No.: 17/799,557

(22) PCT Filed: Apr. 21, 2021

(86) PCT No.: PCT/US2021/028473
§ 371 (c)(1),
(2) Date: Aug. 12, 2022

(87) PCT Pub. No.: WO2021/216765
PCT Pub. Date: Oct. 28, 2021

(65) Prior Publication Data
US 2023/0090972 A1 Mar. 23, 2023

Related U.S. Application Data

(60) Provisional application No. 63/013,746, filed on Apr. 22, 2020.

(51) Int. Cl.
*H04L 9/08* (2006.01)
*H04L 9/32* (2006.01)
*H04L 9/40* (2022.01)

(52) U.S. Cl.
CPC .......... *H04L 9/0822* (2013.01); *H04L 9/3226* (2013.01); *H04L 63/0464* (2013.01)

(58) Field of Classification Search
CPC ....... H04L 9/0822; H04L 9/083; H04L 9/088; H04L 9/14–16; H04L 9/32;
(Continued)

(56) References Cited

U.S. PATENT DOCUMENTS

| 5,479,514 A | 12/1995 | Klonowski |
| 6,516,316 B1 | 2/2003 | Ramasubramani et al. |

(Continued)

FOREIGN PATENT DOCUMENTS

| KR | 20110123828 A | 11/2011 |
| WO | 2015103886 A1 | 7/2015 |
| WO | 2019019826 A1 | 1/2019 |

OTHER PUBLICATIONS

EP21792774.8, "Extended European Search Report", Feb. 24, 2023, 10 pages.
(Continued)

*Primary Examiner* — Kevin Bechtel
(74) *Attorney, Agent, or Firm* — Kilpatrick Townsend & Stockton LLP

(57) ABSTRACT

A method includes receiving, by a server computer, a thin client identifier from a thin client on a communication device. The server computer can then retrieve an encrypted first cryptographic key based on the thin client identifier. The encrypted first cryptographic key is a first cryptographic key that is encrypted with a second cryptographic key. The server computer can initiate the sending of the encrypted first cryptographic key to the thin client. The server computer then receives an encrypted secret from the thin client, the encrypted secret being a secret encrypted with the first cryptographic key.

20 Claims, 7 Drawing Sheets

(58) Field of Classification Search
CPC ....... H04L 9/3226–3228; H04L 9/3271–3273; H04L 63/0428; H04L 63/0435; H04L 63/0464; H04L 63/062; H04L 63/083; H04L 63/0838; H04L 2209/56; H04L 2463/061; H04L 2463/062

See application file for complete search history.

(56) References Cited

U.S. PATENT DOCUMENTS

| | | |
|---|---|---|
| 10,147,089 B2 | 12/2018 | Powell et al. |
| 11,811,923 B2 | 11/2023 | Gryb et al. |
| 11,895,231 B2 | 2/2024 | Mukherjee |
| 12,095,746 B2 | 9/2024 | Mansour et al. |
| 2005/0102509 A1 | 5/2005 | Fascenda |
| 2005/0108528 A1 | 5/2005 | Wanish et al. |
| 2006/0005026 A1 | 1/2006 | Song et al. |
| 2009/0185677 A1 | 7/2009 | Bugbee |
| 2015/0088756 A1* | 3/2015 | Makhotin ............. G06Q 20/12 705/71 |
| 2016/0189126 A1 | 6/2016 | Cheng et al. |
| 2017/0039557 A1 | 2/2017 | Murphy |
| 2017/0118026 A1* | 4/2017 | Yao ....................... H04L 9/0861 |
| 2021/0051002 A1* | 2/2021 | Cheng ................... H04L 9/0819 |
| 2021/0092607 A1* | 3/2021 | Klinkner ............... H04W 12/63 |

OTHER PUBLICATIONS

EP21792774.8 , "Office Action", Jan. 19, 2024, 9 pages.
PCT/US2021/028473 , "International Search Report and Written Opinion", Aug. 5, 2021, 12 pages.

* cited by examiner

ONLINE SECRET ENCRYPTION

CROSS-REFERENCES TO RELATED APPLICATIONS

This application is a U.S. National Stage of PCT Application PCT/US2021/028473, filed on Apr. 21, 2021, which claims the benefit of U.S. Provisional Application No. 63/013,746, filed Apr. 22, 2020, which is are herein incorporated by reference in their entirety for all purposes.

BACKGROUND

Conventional secure input units such as PIN pads and biometric scanners are provisioned with cryptographic keys which are stored in secure locations within the secure input units at the time of manufacture. The availability of such units can be limited, since each unit needs to be specifically manufactured with specific security mechanisms.

In some other types of systems, secure data processing units placed on the cloud (e.g., on a server computer). Local client units are in communication with the secure data processing units and can receive secrets (e.g., biometrics, PINs, etc.) from users. Such local client units can be conventional commercially available mobile phones. Such local client units may not have secure and standardized security mechanisms that are sufficient to protect such secrets.

Embodiments of the disclosure address this problem and other problems individually and collectively.

SUMMARY

Embodiments are related to methods and systems for securely encrypting online secrets using a communication device that has a thin client. The communication device can be a mobile phone that was not provisioned with special cryptographic keys at the time of manufacture.

One embodiment is related to a method comprising: receiving, by a server computer, a thin client identifier from a thin client on a communication device; retrieving, by the server computer, an encrypted first cryptographic key based on the thin client identifier, wherein the encrypted first cryptographic key is a first cryptographic key that is encrypted with a second cryptographic key; initiating, by the server computer, the sending of the encrypted first cryptographic key to the thin client; and receiving, by the server computer, an encrypted secret from the thin client, the encrypted secret being a secret encrypted with the first cryptographic key.

Another embodiment is related to a server computer comprising: a processor; and a computer-readable medium coupled to the processor, the computer-readable medium comprising code executable by the processor for implementing a method comprising: receiving a thin client identifier from a thin client on a communication device; retrieving an encrypted first cryptographic key based on the thin client identifier, wherein the encrypted first cryptographic key is a first cryptographic key that is encrypted with a second cryptographic key; initiating the sending of the encrypted first cryptographic key to the thin client; and receiving an encrypted secret from the thin client, the encrypted secret being a secret encrypted with the first cryptographic key.

Another embodiment is related to a method comprising: providing, by a thin client on a communication device, a thin client identifier to a server computer during an interaction between the communication device and a portable device; receiving, by the thin client, an encrypted first cryptographic key from the server computer, wherein the encrypted first cryptographic key is a first cryptographic key that is encrypted with a second cryptographic key; decrypting, by the thin client, the encrypted first cryptographic key with the second cryptographic key; receiving, by the thin client, a secret from a user of the portable device; encrypting, by the thin client, the secret with the first cryptographic key; and providing, by the thin client, the secret encrypted to the server computer.

Further details regarding embodiments of the disclosure can be found in the Detailed Description and the Figures.

DETAILED DESCRIPTION

Figure 1:
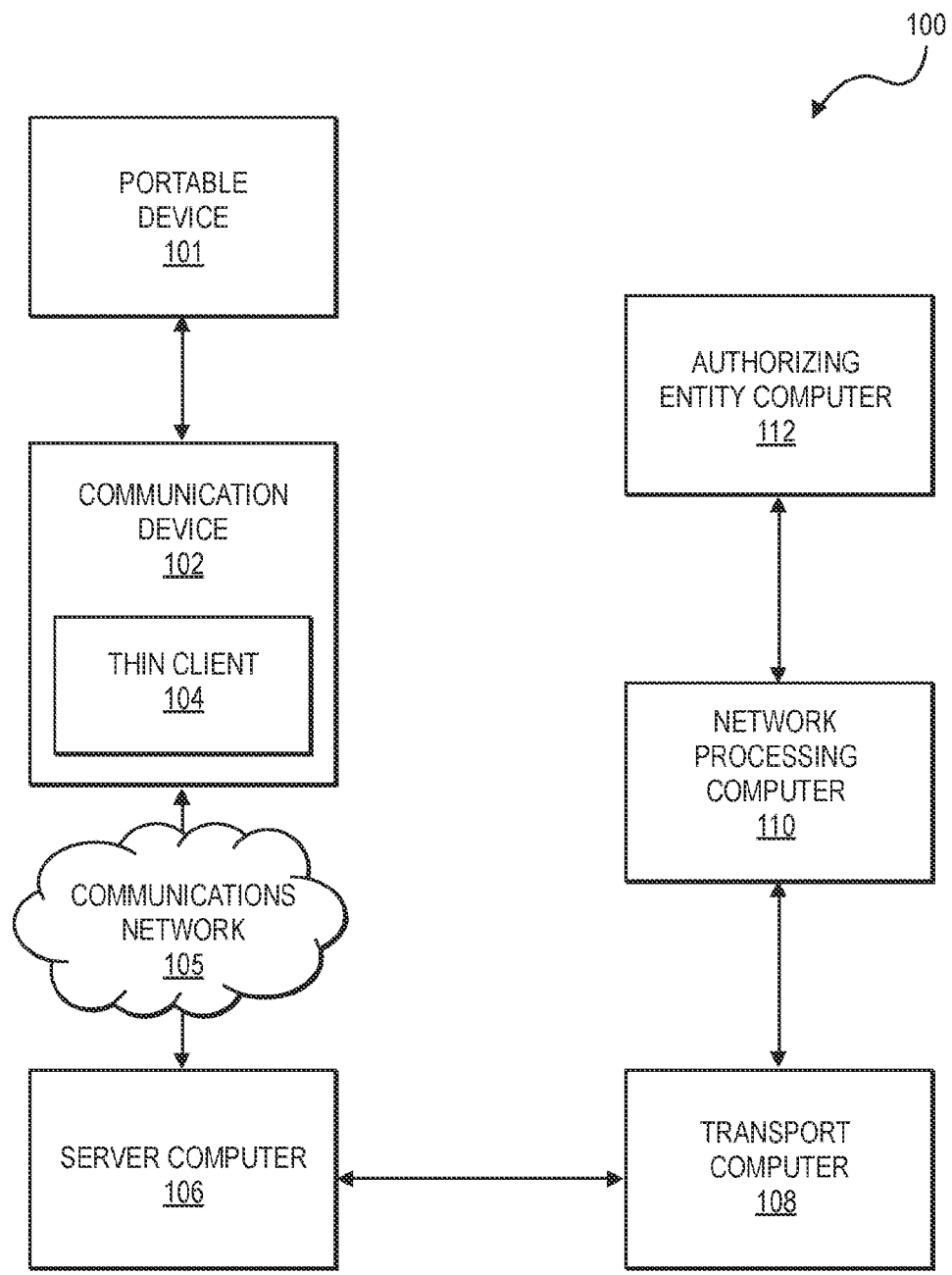
FIG. 1 shows a block diagram of an online secret encryption system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "communication device" may be a device that is operated by a user. Examples of communication devices may include a mobile phone, a smart phone, a card, a personal digital assistant (PDA), a laptop computer, a desktop computer, a server computer, a vehicle such as an automobile, a thin-client device, a tablet PC, etc. Additionally, communication devices may be any type of wearable technology device, such as a watch, earpiece, glasses, etc. The communication device may include one or more processors capable of processing user input. The communication device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The communication device may comprise any electronic device that may be operated by a user, which may also provide remote communication capabilities to a network. Examples of remote communication capabilities include using a mobile phone (wireless) network, wireless data network (e.g., 3G, 4G, 5G, or similar networks), Wi-Fi, Wi-Max, or any other communication medium that may provide access to a network such as the Internet or a private network.

A "portable device" can include a device that can be easily carried or moved. In some embodiments, a portable device may include a device such as a credit or debit card. A portable device may be used to present a credential or access token during an interaction. A portable device may have some form of data storage, such as a magnetic strip or an EMVco chip, and a portable device may use the data storage in order to store an access token or credential. A portable device may be able to interface with an access device. In some embodiments, a portable device may be a communication device.

A "thin client" can include an application or software capable of communicating with a server computer. A thin client can process data in conjunction with the server computer and may offload a majority of the processing to the server computer. A thin client can be present on a communication device. In some embodiments, a thin client may communicate with a server computer to process an interaction.

A "thin client identifier" can include a sequence of characters used to identify or refer to a thin client. A thin client identifier can include any suitable alphanumeric characters. A thin client identifier can be an issued thin client identifier. An issued thin client identifier can be assigned and provided to a thin client. For example, a server computer can generate, assign, and provide a thin client identifier to a thin client.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "cryptographic key" can include a piece of information that determines an output of a cryptographic algorithm. For encryption algorithms, a cryptographic key can specify a transformation of a plaintext into a ciphertext. For decryption algorithms, a cryptographic key can specify a transformation of a ciphertext into a plaintext.

A "secret" can include something that is kept or meant to be kept unknown or unseen by others. A secret can include a user's biometric template, a password, a personal identification number, a social security number, a one-time password, and any other data that is meant to be kept unknown or unseen by others. In some embodiments, a user of a portable device can input a secret into a communication device of a resource provider in order to perform an interaction. The secret can be kept unknown or unseen from the resource provider.

A "hardware security module" can include a physical computing device that safeguards and manages data. A hardware security module can safeguard and manage digital cryptographic keys, perform encryption and decryption functions for messages and/or digital signatures, performs authentication, and/or any other cryptographic functions.

The term "verification" and its derivatives can include a process that utilizes information to determine whether an underlying subject is valid under a given set of circumstances. Verification may include any comparison of information to ensure some data or information is correct, valid, accurate, legitimate, and/or in good standing.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Systems

According to embodiments, a secret can be entered into a communication device with a thin client, and can be securely provided to a downstream computer such as an authorizing entity computer. The secret is encrypted as it passes from the communication device to the downstream computer. If it is intercepted by a malicious party, the malicious party cannot obtain the secret. In some embodiments, the secret can be encrypted with a first cryptographic key when provided from the thin client to the server computer. Furthermore, the first cryptographic key is not exposed because it is encrypted with a second cryptographic key when provided between the thin client and the server computer.

A. System Overview

FIG. 1 shows a system 100 according to embodiments of the disclosure. The system 100 comprises a portable device 101 and a communication device 102 including a thin client 104. The system 100 also comprises a communications network 105, a server computer 106, a transport computer 108, a network processing computer 110, and an authorizing entity computer 112. The communication device 102 can be in operative communication with the server computer 106. In some embodiments, the thin client 104 can be in operative communication with the server computer 106 using a communication element of the communication device 102. The server computer 106 can be in operative communication with the transport computer 108, which may be in operative communication with the network processing computer 110. The network processing computer 110 can be in operative communication with the authorizing entity computer 112.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the thin client 104 of the communication device 102 and the server computer 106 can be transmitted through a communications network 105 using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network 105 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network 105 can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The portable device 101 can include a device that can be easily carried or moved and may be operated and/or used by a user. In some embodiments, the portable device 101 may include a device such as a credit or debit card. The portable device 101 can be utilized by the user to initiate an interaction with a resource provider of the communication device 102. For example, the portable device 101 may be brought into communication range (e.g., short range communication) with the communication device 102. The portable device 101 can provide interaction data to the communication device 102 during the interaction.

The communication device 102 can include a device operated by a resource provider. The communication device 102, for example, can include a smartphone, a laptop, etc. The communication device 102 can be configured to perform an interaction between the resource provider and the user to provide a resource, access to a resource, provide a resource, or provide access to a resource to the user. The communication device 102 can connect to the server computer 106 via the thin client 104 installed on the communication device 102.

The thin client 104 can include a software on the communication device that runs from resources stored on the server computer 106 instead of a localized hard drive. The thin client 104 can connect remotely to the server computer 106 with various applications and hardware secure modules are present.

In some embodiments, the thin client 104 can prompt the user to input information into the communication device 102. For example, the thin client 104 can prompt the user to input a secret. The thin client 104 can derive (i.e., independently derive) a cryptographic key from information provided from the server computer 106 and then encrypt the secret as specified by the server computer 106, described in further detail herein. The thin client 104 can provide the encrypted secret to the server computer 106 for further processing.

The server computer 106 can include a computer that provides functionality to the thin client 104. The server computer 106 can receive information from the thin client 104 and process the information on behalf of the thin client 104. The server computer 106 can receive encrypted secrets from the thin client 104 during an interaction between the user of the portable device 101 and the resource provider of the communication device 102. The server computer 106 can translate the encrypted secret from one encrypted domain to a second encrypted domain. For example, the server computer 106 can decrypt the encrypted secret with a cryptographic key, then encrypt the secret with a different cryptographic key (e.g., a transport computer cryptographic key). The server computer 106 can then provide the encrypted secret to the transport computer 108 in an authorization request message.

The transport computer 108 can include any computer for receiving and forwarding authorization request messages according to embodiments of the invention. The transport computer 108 can receive a secret(s) encrypted with a transport computer cryptographic key from the server computer. The transport computer 108 can decrypt the secret encrypted with the transport computer cryptographic key to obtain the secret. In some embodiments, the transport computer 108 may be a computer of an acquiring entity that enables a resource provider to conduct specific types of transactions. The transport computer 108 can be operated by an acquirer and can be an acquirer computer in this case.

The network processing computer 110 can include computers, server computers, databases, and/or any combination thereof to coordinate the functions of routing, generating, and formatting messages to facilitate embodiments. In other embodiments, the network processing computer 110 may be in a payment processing network. The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The authorizing entity computer 112 can be operated by an issuing and/or authorizing entity (e.g., an issuer). An issuer can maintain an account on behalf of a user. For example, the authorizing entity computer 112 can maintain an account on behalf of the user of the communication device 102. The account, which is associated with the user, can be identified by user account data. The first user account data can be a real account number and/or a token.

B. Server Computer

Figure 2:
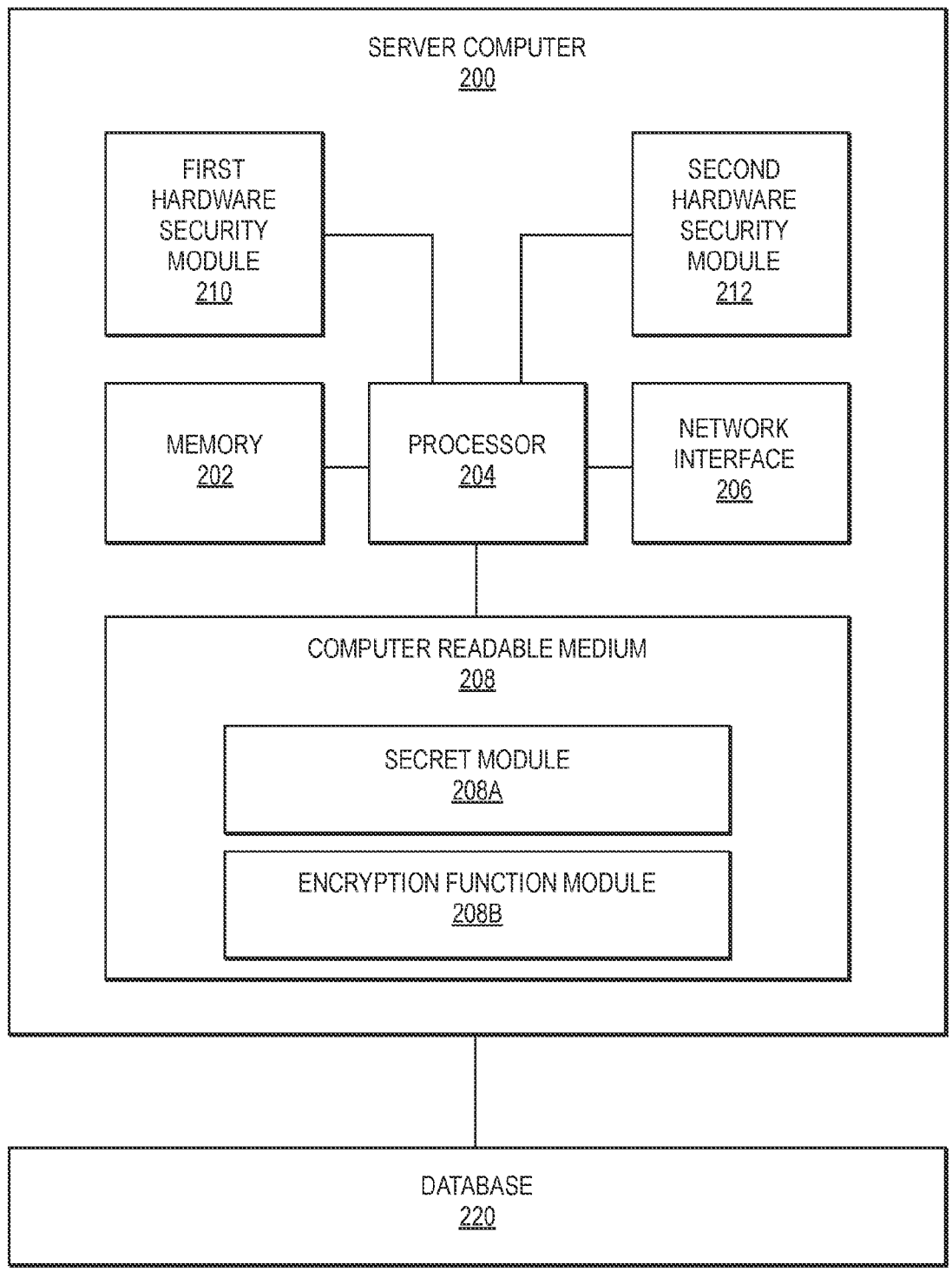
FIG. 2 shows a block diagram of components of a server computer according to embodiments.

FIG. 2 shows a block diagram of a server computer 200 according to embodiments. The exemplary server computer 200 may comprise a processor 204. The processor 204 may be coupled to a memory 202, a network interface 206, a computer readable medium 208, a first hardware security module 210, and a second hardware security module 212. The computer readable medium 208 can comprise a secret module 208A and an encryption function module 208B. In some embodiments, the server computer 200 may be in operative communication with a database 220.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, interaction data, etc.

The computer readable medium 208 may comprise code, executable by the processor 204, for performing a method comprising: receiving, by a server computer, a thin client identifier from a thin client on a communication device; retrieving, by the server computer, an encrypted first cryptographic key based on the thin client identifier, wherein the encrypted first cryptographic key is a first cryptographic key that is encrypted with a second cryptographic key; initiating, by the server computer, the sending of the encrypted first cryptographic key to the thin client; and receiving, by the server computer, an encrypted secret from the thin client, the encrypted secret being a secret encrypted with the first cryptographic key.

The secret module 208A may comprise code or software, executable by the processor 204, for processing secrets. The secret module 208A, in conjunction with the processor 204, can initialize data that is to be used in the generation of cryptographic keys for securely encrypting a secret. The secret module 208A, in conjunction with the processor 204, can receive requests for cryptographic keys from the server computer 200. The secret module 208A, in conjunction with the processor 204, can communicate with the encryption function module 208B, the first hardware security module 210, and the second hardware security module 212 to provide the previously generated cryptographic keys to the server computer 200. After which, the server computer 200 may provide the cryptographic keys, in particular an encrypted first cryptographic key that is encrypted with a second cryptographic key, to a thin client. The thin client can return a secret that is encrypted with the first cryptographic key. The secret module 208A, in conjunction with the processor 204, can receive the encrypted secret from the server computer 200. The secret module 208A, in conjunction with the processor 204, can communicate with the database 220 to obtain translation parameters that can be utilized by the second hardware security module 212 to translate the encrypted secret from a first encrypted domain (e.g., encrypted with the first cryptographic key) to a second encrypted domain (e.g., encrypted with a third cryptographic key). After obtaining the translation parameters, the secret module 208A, in conjunction with the processor 204, can provide the encrypted secret and the translation parameters to the encryption function module 208B.

The encryption function module 208B can include may comprise code or software, executable by the processor 204, for providing secure communications between hardware security modules (e.g., the first hardware security module 210 and the second hardware security module 212) and the secret module 208A. The encryption function module 208B, in conjunction with the processor 204, can determine to which hardware security module to provide a message from the secret module 208A. For example, the encryption function module 208B, in conjunction with the processor 204, can provide cryptographic key generation request messages to the first hardware security module 210. The encryption function module 208B, in conjunction with the processor 204, can provide encrypted secret encryption domain translation messages to the second hardware security module 212. Furthermore, the encryption function module 208B, in conjunction with the processor 204, can perform cryptographic operations on received messages to establish the message in a format and/or cryptographic domain that is readable by the intended component.

The network interface 206 may include an interface that can allow the server computer 200 to communicate with external computers. The network interface 206 may enable the server computer 200 to communicate data to and from another device or module (e.g., communication device 102, a thin client 104, a transport computer 108, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the server computer 200 may be in operative communication with the database 220. The database 220 can include any suitable database. The database may be a conventional, fault tolerant, relational, scalable, secure database such as those commercially available from Oracle™ or Sybase™.

II. Methods

Embodiments can use the systems and apparatuses described herein to at least securely provide a secret from a thin client to a transport computer via a server computer. FIGS. 3, 4A-4B, and 5A-5B describe some examples of such methods.

A. Overview

Figure 3:
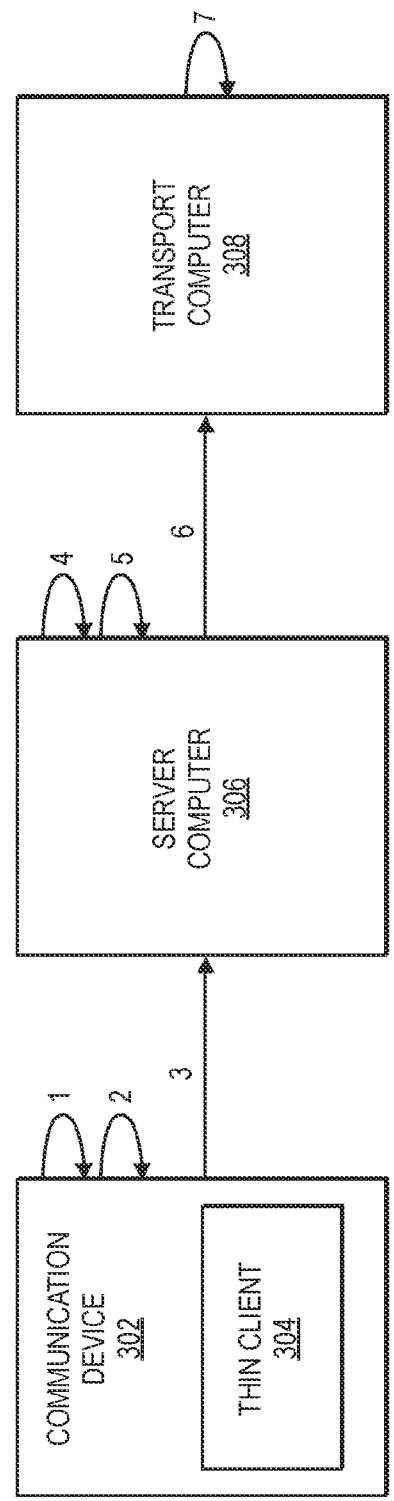
FIG. 3 shows a flow diagram of an online PIN card holder verification method process according to embodiments.

Prior to discussing details of the method, an overview of the process will be discussed in reference to FIG. 3. FIG. 3 shows a flow diagram of an online PIN card holder verification method process according to embodiments. The process illustrated in FIG. 3 can be performed by a communication device 302, which includes a thin client 304, a server computer 306, as well as a transport computer 308. Further details regarding steps 1-7 can be found described in reference to FIGS. 4A, 4B, 5A, and 5B.

At step 1, the communication device 302 can receive a secret input by a user of the communication device 302. For example, the secret can be a personal identification number (PIN), a one-time passcode (OTP), a biometric, etc. The user can input the secret into the communication device 302 in any suitable manner (e.g., a key pad, a biometric scanner, one or more buttons, a touch screen, etc.).

At step 2, the thin client 304 of the communication device 302 can encrypt the secret with a first cryptographic key. In some embodiments, the communication device 302 can obtain the first cryptographic key from the server computer 306. The first cryptographic key can be a symmetric key.

At step 3, after encrypting the secret, the thin client 304 can provide the secret encrypted with the first cryptographic key to the server computer 306.

At step 4, after receiving the secret encrypted with the first cryptographic key, the server computer 306 can decrypt the secret using the first cryptographic key.

At step 5, the server computer 306 can encrypt the secret with a transport computer cryptographic key (e.g., a third cryptographic key). The transport computer cryptographic key can be a symmetric key.

At step 6, after encrypting the secret with the transport computer cryptographic key, the server computer 306 can provide the encrypted secret to the transport computer 308.

At step 7, after receiving the encrypted secret from the server computer 306, the transport computer 308 can decrypt the secret encrypted with the transport computer cryptographic key using the transport computer cryptographic key. The transport computer 308 can the process the secret in any suitable manner. For example, in some embodiments, the secret may be provided in an authorization request message to an authorizing entity computer (not shown) via a network processing computer for authorization of an interaction between the user of the portable device and a resource provider of the communication device 302.

As an example, the secret encrypted with the third cryptographic key can be provided to the transport computer 308, from the server computer 306, in an authorization request message. The transport computer 308 can decrypt the encrypted secret with the third cryptographic key. The transport computer 308 can encrypt the secret with a fourth cryptographic key, which can be an authorizing entity computer cryptographic key. The transport computer 308 can modify the authorization request message to include the encrypted secret and provides the modified authorization request message to the authorizing entity computer. The authorizing entity computer can decrypt the encrypted secret using the fourth cryptographic key and can then determine whether or not to authorize the interaction associated with the secret. The authorizing entity computer can generate an indication of whether or not the interaction is authorized and generate an authorization response message including the indication of whether or not the interaction is authorized. The authorizing entity computer can provide the authorization response message to the server computer 306 via the transport computer 308. After receiving the authorization response message, the server computer 306 can provide the authorization response message to the thin client 304 of the communication device 302.

B. Initialization

The thin client can be enrolled in the system (e.g., with a server computer) to use server computer based services, such as secure online secret communication. During enrollment, the server computer can generate and provide an issued thin client identifier that is assigned to the thin client.

After creating the issued thin client identifier, several parameters and security assets can be pre-generated and initialized for the thin client to be able to use the server computer online secret verification method. For example, the server computer can at least initialize a base derivation key and an interaction counter.

Figure 4A:
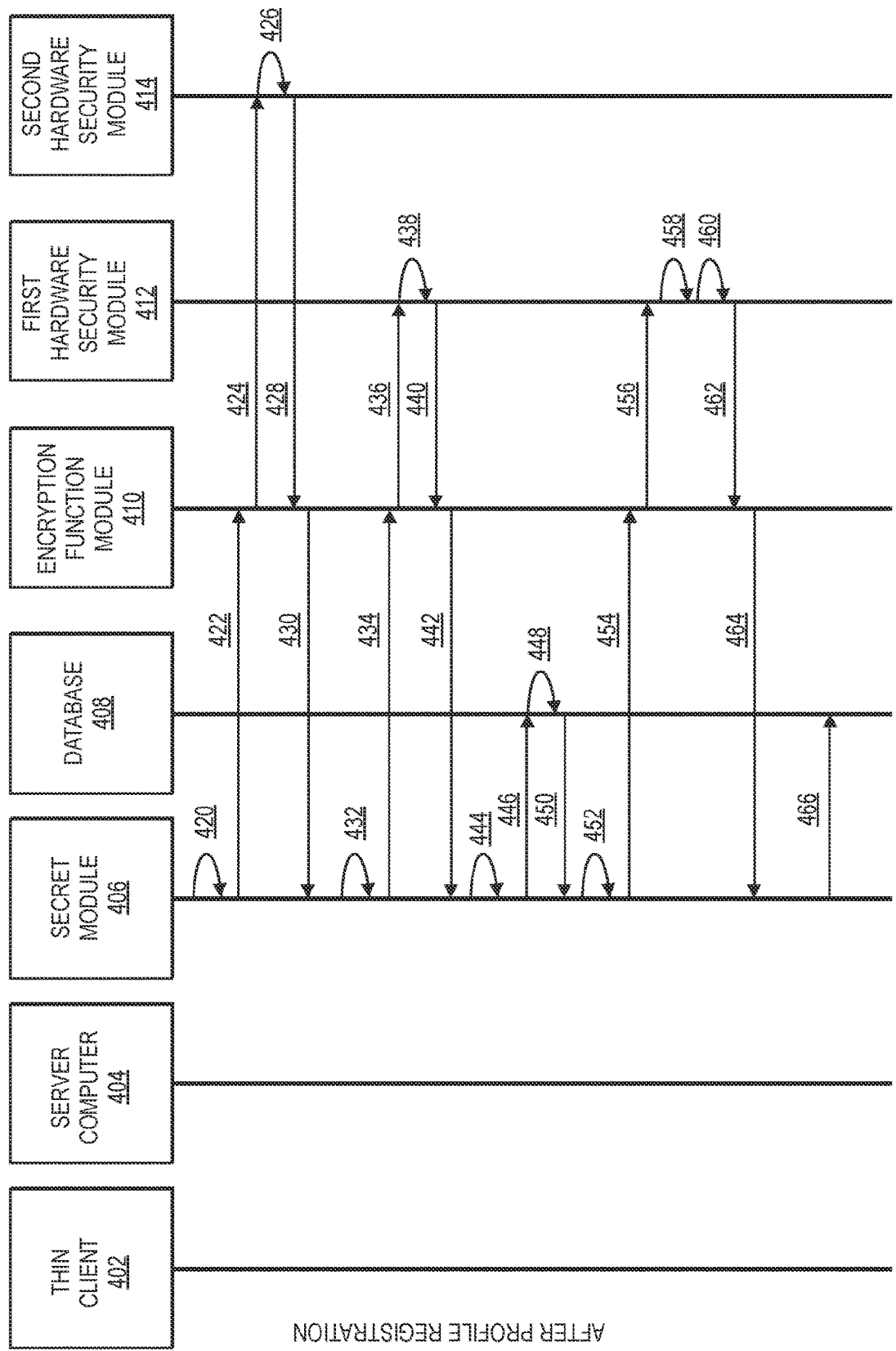
FIGS. 4A-4B show flow diagrams of an initialization method according to embodiments.
Figure 4B:
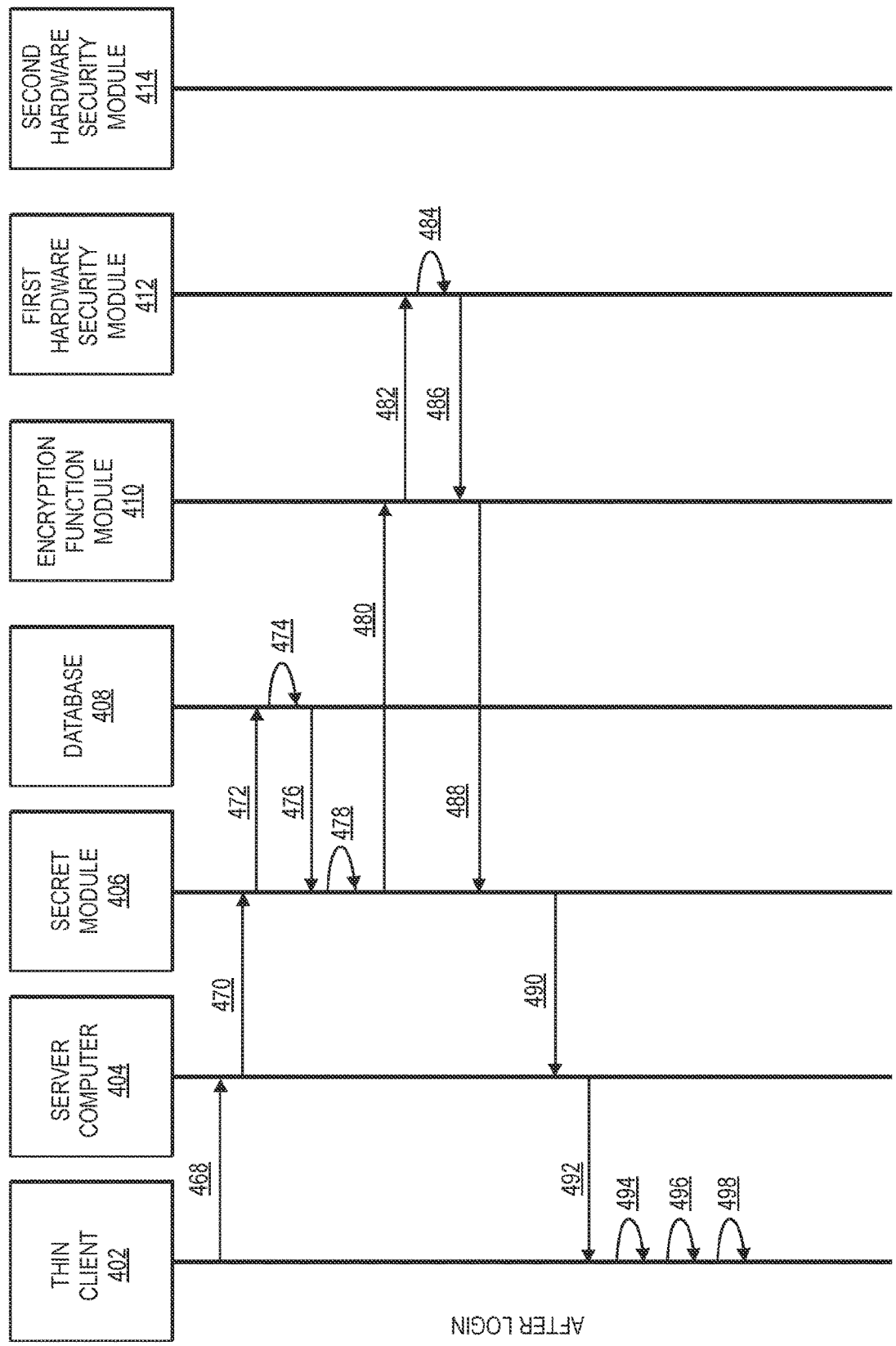

FIGS. 4A-4B show flow diagrams of an initialization method according to embodiments. The method includes an after profile registration process in FIG. 4A and an after login process in FIG. 4B. FIGS. 4A-4B show a thin client 402, a server computer 404, a secret module 406, a database 408, an encryption function module 410, a first hardware security module 412, and a second hardware security module 414. As shown, messages may pass between these devices. In some embodiments, the secret module 406, the database 408, the encryption function module 410, and the first hardware security module 412, and the second hardware security module 414 can be components included within the server computer 404. For example, the secret module 406, the database 408, the encryption function module 410, and the first hardware security module 412, and the second hardware security module 414 can be a server computer backend. In other embodiments, each of the secret module 406, the database 408, the encryption function module 410, and the first hardware security module 412, and the second hardware security module 414 may be located at a different computer.

In some embodiments, a single hardware security module may be used instead of two hardware security modules. For example, the first hardware security module 412 and the second hardware security module 414 can be integrated into a single hardware security module.

At step 420, the secret module 406 can initialize cryptographic key parameters. For example, the secret module 406 can initialize an interaction counter (TX_counter) and a derivation identifier (Derivation_id). The secret module 406 can further initialize any additional cryptographic key parameters that may be utilized during generation of one or more cryptographic keys. The secret module 406 can also create a command for a hardware security module to generate a base derivation key (BDK).

The base derivation key can be generated by a hardware security module such that a unique cryptographic key can be derived from the base derivation key. The derived unique key can be unique to each interaction. The derived unique key can be a first cryptographic key (K_PIN). Based on a derived unique key per interaction method [DUKPT], the base derivation key can be a 128-bit 3DES key. In some embodiments, the base derivation key can be generated inside of the second hardware security module 414 (e.g., a Payshield HSM) and exported to the first hardware security module 412. In some embodiments, the base derivation key can be different and unique for each transport computer. In some embodiments, the base derivation key can be only known in the clear to the first hardware security module 412 and the second hardware security module 414.

The interaction counter can be a counter that is used as one of the cryptographic key parameters for generating the first cryptographic key. The interaction counter is incremented by 1 (or other predetermined increment) for each subsequently updated first cryptographic key. Upon thin client enrollment, the interaction counter is initialized to 0. Updates to the first cryptographic key are discussed in further detail in FIG. 5B.

The derivation identifier can be a portion of the issued thin client identifier. For example, the derivation identifier can be the rightmost 32-bit of the issued thin client identifier. The derivation identifier can be one of the parameters used to derive a key based on the DUKPT method.

After initializing the base derivation key, the secret module 406 can import the base derivation key into a second hardware security module 414. For example, at step 422, the secret module 406 can provide the base derivation key to an encryption function module 410 in an import base derivation key command (e.g., Import_BDK(BDK), which causes the encryption function module 410 to provide the base derivation key to the second hardware security module 414.

At step 424, after receiving the base derivation key, the encryption function module 410 can provide the base derivation key to the second hardware security module 414. As such, the base derivation key may be imported to the second hardware security module 414.

At step 426, after receiving the base derivation key, the second hardware security module 414 can store the base derivation key.

At step 428, the second hardware security module 414 can provide a base derivation key identifier (e.g., BDK_id) to the encryption function module 410 in response to receiving the base derivation key.

At step 430, after receiving the base derivation key identifier from the second hardware security module 414, the encryption function module 410 can provide the base derivation key identifier to the secret module 406.

At step 432, after receiving the base derivation key identifier from the encryption function module 410, the secret module 406 can store the base derivation key identifier. In some embodiments, the secret module 406 can store the base derivation key identifier in the database 408.

At step 434, the secret module 406 can provide the base derivation key to the encryption function module 410 in an import base derivation key command (e.g., Import_BDK(BDK)), which indicates for the encryption function module 410 to provide the base derivation key to the first hardware security module 412.

At step 436, after receiving the base derivation key, the encryption function module 410 can provide the base derivation key to the first hardware security module 412.

At step 438, after receiving the base derivation key, the first hardware security module 412 can store the base derivation key.

At step 440, the first hardware security module 412 can provide a base derivation key identifier (e.g., BDK_id) to the encryption function module 410 in response to receiving the base derivation key.

At step 442, after receiving the base derivation key identifier from the first hardware security module 412, the encryption function module 410 can provide the base derivation key identifier to the secret module 406.

At step 444, after receiving the base derivation key identifier from the encryption function module 410, the secret module 406 can store the base derivation key identifier. In some embodiments, the secret module 406 can store the base derivation key identifier in the database 408.

At step 446, the secret module 406 can query a database 408 for a thin client public key ($K_{D-ENC-PUB}$). The thin client public key can be a static public key of the thin client 402. The thin client public key can be used for negotiating a second cryptographic key (K_KPIN_ENC), which may be a session key, to protect a first cryptographic key (K_PIN) between a server computer 404 and the thin client 402. The query provided to the database 408 can include an issued thin client identifier (VAC_device_id). The issued thin client identifier can be an identifier assigned to the thin client 402 upon successful profile enrollment. In some embodiments, the issued thin client identifier can be a 128-bit unique identifier.

The secret module 406 can query the database 408 for the thin client public key ($K_{D-ENC-PUB}$) in any suitable manner using the thin client identifier (VAC_device_id). For example, the secret module 406 can provide a lookup command, API call, etc. (e.g., Lookup_Device_public_key) to the database 408. The second cryptographic key can also later be derived at the thin client 402. The second cryptographic key can be a symmetric key.

At step 448, upon receiving the query from the secret module 406, the database 408 can determine an appropriate response to the query by, at least, searching for the thin client public key using the issued thin client identifier.

At step 450, after obtaining the thin client public key, the database 408 can provide the thin client public key ($K_{D-ENC-PUB}$) to the secret module 406.

At step 452, after receiving the thin client public key from the database 408, the secret module 406 can generate a cryptographic key request message (e.g., gen_PINkey_wrapped). The cryptographic key request message can request that the relevant hardware security module (e.g., the first hardware security module) generate a first cryptographic key (K_PIN). The secret module 406 can generate the cryptographic key request message comprising the issued thin client identifier, the derivation identifier, the interaction counter, the base derivation key identifier (BD-K_id), and the thin client public key. The base derivation key identifier from each hardware security module can identify the same base derivation key. In some embodiments, each base derivation key identifier can be the same value. In other embodiments, each base derivation key identifier can be different, but can still identify the same base derivation key.

At step 454, after generating the cryptographic key request message, the secret module 406 can provide the cryptographic key request message to the encryption function module 410.

At step 456, after receiving the cryptographic key request message, the encryption function module 410 can provide the cryptographic key request message to the first hardware security module 412.

At step 458, after receiving the cryptographic key request message, the first hardware security module 412 can generate the first cryptographic key (K_PIN). The first cryptographic key can be a 128 3DES-ECB key (Triple Data Encryption Algorithm-Electronic Codebook) generated using a derived unique key per interaction method [DUKPT]. The derived unique key per interaction method can be implemented inside the first hardware security module 412 (e.g., an NShield hardware security module). The initial first cryptographic key (e.g., K_PIN) is generated after thin client profile enrollment. Three parameters can be used to generate the initial first cryptographic key: a derivation identifier (e.g., a portion of a public key of the thin client), a base derivation key identifier/base derivation key, and an interaction counter.

At step 460, after generating the first cryptographic key (e.g., K_PIN), the first hardware security module 412 can generate a second cryptographic key (K_KPIN_ENC). The second cryptographic key (K_KPIN_ENC) is used to protect the first cryptographic key. The first cryptographic key (K_PIN) can be protected while in-transit between the thin client 402 and the server computer 404, and at-rest when stored in the server computer backend database (e.g., the database 408). The second cryptographic key can be generated based on the following steps inside the first hardware security module 412.

First, the first hardware security module 412 generates an ephemeral 256-bit ECC key pair. The ephemeral key pair includes an ephemeral server computer private key ($K_{VAC-PIN-PVT}$) and an ephemeral server computer public key ($K_{VAC-PIN-PUB}$). Using the thin client's static public key ($K_{D-ENC-PUB}$) a shared secret is negotiated between thin client 502 and the server computer 504 using elliptic curve Diffie Helman cryptography (ECDH). For example, the first hardware security module 412 can determine the shared secret of Z=ECDH ($K_{VAC-PIN-PVT}$, $K_{D-ENC-PUB}$). A second cryptographic key (e.g., a session key) and an initialization vector ($IV_{pin}$) can then be derived. The first hardware security module 412 can derive the second cryptographic key by creating a hashed-based message authentication code (HMAC), which is an operation described in [FIPS-198]. The HMAC can have three inputs that include a key input (K), a hash function input (HF), and a message input (M). The first hardware security module 412 can determine the hashed-based message authentication code of the shared secret (Z) used as a key input (K), a SHA-256 hash function used as a hash function input (HF), and the issued thin client identifier (VAC_device_id) as a message input (M). The HMAC can be set equal to a concatenation of the second cryptographic key, which is to be determined, and the initialization vector. The first hardware security module 412 can determine the second cryptographic key that, when concatenated with the initialization vector, equals the HMAC. For example, the first hardware security module 412 can derive the second cryptographic key (K_KPIN_ENC) using the following equation:

K_KPIN_ENC (128 bits)||$IV_{pin}$ (96 bits)=HMAC [K: Z, HF: SHA-256, M: VAC_device_id].

Second, the first hardware security module 412 encrypts the first cryptographic key (K_PIN) with the second cryptographic key (K_KPIN_ENC). For example, the first hardware security module 412 can encrypt the first cryptographic key with the second cryptographic key using advanced encryption standard-Galois/Counter mode (AES-GCM):

[{K_PIN}K_KPIN_ENC||GCM_Auth_TAG]=
AES_GCM [K: K_KPIN_ENC, PT: K_PIN, IV: $IV_{pin}$, AAD: No additional authenticated data (AAD)]

At step 462, after generating the first cryptographic key and the second cryptographic key, the first hardware security module 412 can provide a cryptographic key response message to the encryption function module 410. The cryptographic key response message can include the first cryptographic key (K_PIN) encrypted with the second cryptographic key (K_KPIN_ENC), the second cryptographic key (K_KPIN_ENC), the initialization vector ($IV_{PIN}$), and the server computer ephemeral public key ($K_{VAC-PIN-PUB}$). The server computer ephemeral public key ($K_{VAC-PIN-PUB}$) can be used by the thin client to later determine the second cryptographic key (K_KPIN_ENC). The first cryptographic key (K_PIN) is protected by the second cryptographic key (K_KPIN_ENC) as it is transmitted between the server computer 404 and thin client 402. The initialization vector ($IV_{PIN}$) can be later used by the thin client to decrypt the first cryptographic key (K_PIN) with the second cryptographic key (K_KPIN_ENC).

At step 464, after receiving the cryptographic key response message, the encryption function module 410 provides the cryptographic key response message to the secret module 406.

At step 466, after receiving the cryptographic key response message, the secret module 406 can store the issued thin client identifier, the first cryptographic key encrypted with the second cryptographic key, the interaction counter, the second cryptographic key, the server computer ephemeral public key, and the initialization vector in association with one another in the database 408.

For example, the following data entry can be created in the database 408, and can be associated with the unique issued thin client identifier:

{K_PIN}K_KPIN_ENC, K_KPIN_ENC,
Tx_Counter, $IV_{pin}$, $K_{VAC-PIN-PUB}$, BDK_id, and Derivation_id.

When an updated first cryptographic key is created (for each subsequent secret utilizing interaction), the updated first cryptographic key can be wrapped using the second cryptographic key and stored in the server computer backend database (e.g., the database 408). Additionally, the initialization vector ($IV_{pin}$) has a unique value for each encryption of first cryptographic keys as the first cryptographic key is updated. Therefore, for encrypting an updated first cryptographic key, the initialization vector is incremented by 1 (e.g., new$IV_{pin}$=$IV_{pin}$+1). Updating the cryptographic keys are further discussed in FIG. 5B.

FIG. 4B shows a flow diagram of an initialization method according to embodiments. The method illustrated in FIG. 4B can be performed after the method illustrated in FIG. 4A and after user login. The method illustrated in FIG. 4B can provide a server computer ephemeral public key to the thin client 402 such that the thin client 402 can derive the second cryptographic key based on, in part, the server computer ephemeral public key.

During user login, the thin client 402 can be mutually authenticated with the server computer 404. Furthermore, a secure channel can be established between the thin client 402 and the server computer 404. In some embodiments, upon successful login, three cryptographic keys can be derived for confidentiality and integrity protection of interaction data (e.g., transaction data, data transfer data, etc.). The keys that are derived upon successful login can include a signing key (K_mac), a sensitive data key (K_key), and an interaction payload key (K_enc). The signing key (K_mac) can be a 256-bit key used for signing transaction payloads in form of JSON Web Signature (JWS) (e.g., HMAC with SHA-256). The sensitive data key (K_key) can be a 128-bit AES-GCM key used for confidentiality protection of sensitive data. The interaction payload key (K_enc) can be a 128-bit AES-GCM key used for confidentiality protection of transaction payloads. These three cryptographic keys can be generated by the thin client 402 and provided to the server computer 404.

At step 468, after login, the thin client 402 can provide a PIN public key request message to the server computer 404. The PIN public key request message can be a function of the server computer 404 that is exposed to the thin client 402 for use.

At step 470, after receiving the PIN public key request message from the thin client 402, the server computer 404 can request the PIN public key from the secret module 406 using any suitable message or function call. For example, the server computer 404 can provide the PIN public key request message to the secret module 406.

At step 472, after receiving the public key request message, the secret module 406 can query the database 408 for the server computer ephemeral public key (e.g., $K_{VAC\text{-}PIN\text{-}PUB}$). The server computer ephemeral public key was previously stored in the database 408 at step 466 in FIG. 4A.

At step 474, after receiving the request for the server computer ephemeral public key, the database 408 can identify and obtain the server computer ephemeral public key.

At step 476, after obtaining the server computer ephemeral public key, the database 408 can provide the server computer ephemeral public key to the secret module 406.

At step 478, after receiving the server computer ephemeral public key, the secret module 406 can generate a secure message generation request message. The secure message generation request message can be a request to generate a JWS_JWE (JSON Web Signature_JSON Web Encryption) message with the server computer ephemeral public key ($K_{VAC\text{-}PIN\text{-}PUB}$) and to deliver the secure message (e.g., the JWS_JWE message) to the thin client 402. The secure message generation request message can include the server computer ephemeral public key received from the database 408. In some embodiments, the secure message generation request message can include the signing key (K_mac) and the sensitive data key (K_key).

At step 480, after generating the secure message generation request message, the secret module 406 can provide the secure message generation request message to the encryption function module 410.

At step 482, after receiving the secure message generation request message, the encryption function module 410 can provide the secure message generation request message to the first hardware security module 412. In some embodiments, the encryption function module 410 can verify the signing key (K_mac) and the sensitive data key (K_key) prior to providing the secure message generation request message to the first hardware security module 412.

At step 484, after receiving the secure message generation request message, the first hardware security module 412 can generate a secure message. In some embodiments, the first hardware security module 412 can generate the secure message using the signing key (K_mac) and the sensitive data key (K_key). For example, the secure message can be in a JWS_JWE message generated using the signing key (K_mac) and the sensitive data key (K_key). The secure message can include the server computer ephemeral public key.

At step 486, after generating the secure message, the first hardware security module 412 can provide the secure message to the encryption function module 410 in response to the secure message generation request message.

At step 488, after receiving the secure message, the encryption function module 410 can provide the secure message to the secret module 406.

At step 490, after receiving the secure message from the encryption function module 410, the secret module 406 can provide the secure message to the server computer 404.

At step 492, after receiving the secure message, the server computer 404 can provide the secure message to the thin client 402.

At step 494, after receiving the secure message, the thin client 402 can verify the secure message. For example, the thin client 402 can verify the JWE and JWS of the secure message as known to one of skill in the art. The thin client 402 can verify a received JWS-JWE token included in the JWS-JWE message.

At step 496, after verifying the secure message, the thin client 402 can derive the second cryptographic key (K_KPIN_ENC). For example, the thin client 402 can generates the same shared secret, as described above, elliptic curve Diffie Helman cryptography (ECDH). For example, the thin client 402 can perform Z=ECDH ($K_{D\text{-}ENC\text{-}PVT}$, $K_{VAC\text{-}PIN\text{-}PUB}$), and derives the second cryptographic key (K_KPIN_ENC) (128 bits)||$IV_{pin}$ (96 bits)=HMAC [K: Z, HF: SHA-256, M: VAC_device_id], as described herein. The thin client 402 then securely stores the second cryptographic key for its lifetime and decrypts the received first cryptographic keys using the stored second cryptographic key and initialization vector. The thin client can increment the initialization vector by 1 to decrypt encrypted updated first cryptographic keys.

At step 498, after deriving the second cryptographic key, the thin client 402 can decrypt the first cryptographic key that is encrypted with the second cryptographic key by using the second cryptographic key.

The second cryptographic key (K_KPIN_ENC) is refreshed when its lifetime is over. A new set of ephemeral keys can be generated on the hardware security module and the new public key is sent to thin client for generating a new second cryptographic key (K_KPIN_ENC) and initialization vector ($IV_{pin}$).

When the first cryptographic key is sent to the thin client 402, the server computer backend starts to generate an updated first cryptographic key using derived unique key per interaction algorithm and an updated interaction counter (e.g., incremented by 1) in the first hardware security module 412. The first cryptographic key is encrypted using the second cryptographic key and stored on the server computer backend database (e.g., the database 408) for the next online secret user verification method event. This process is described in further detail in FIGS. 5A-5B.

C. Secret Translation

Figure 5A:
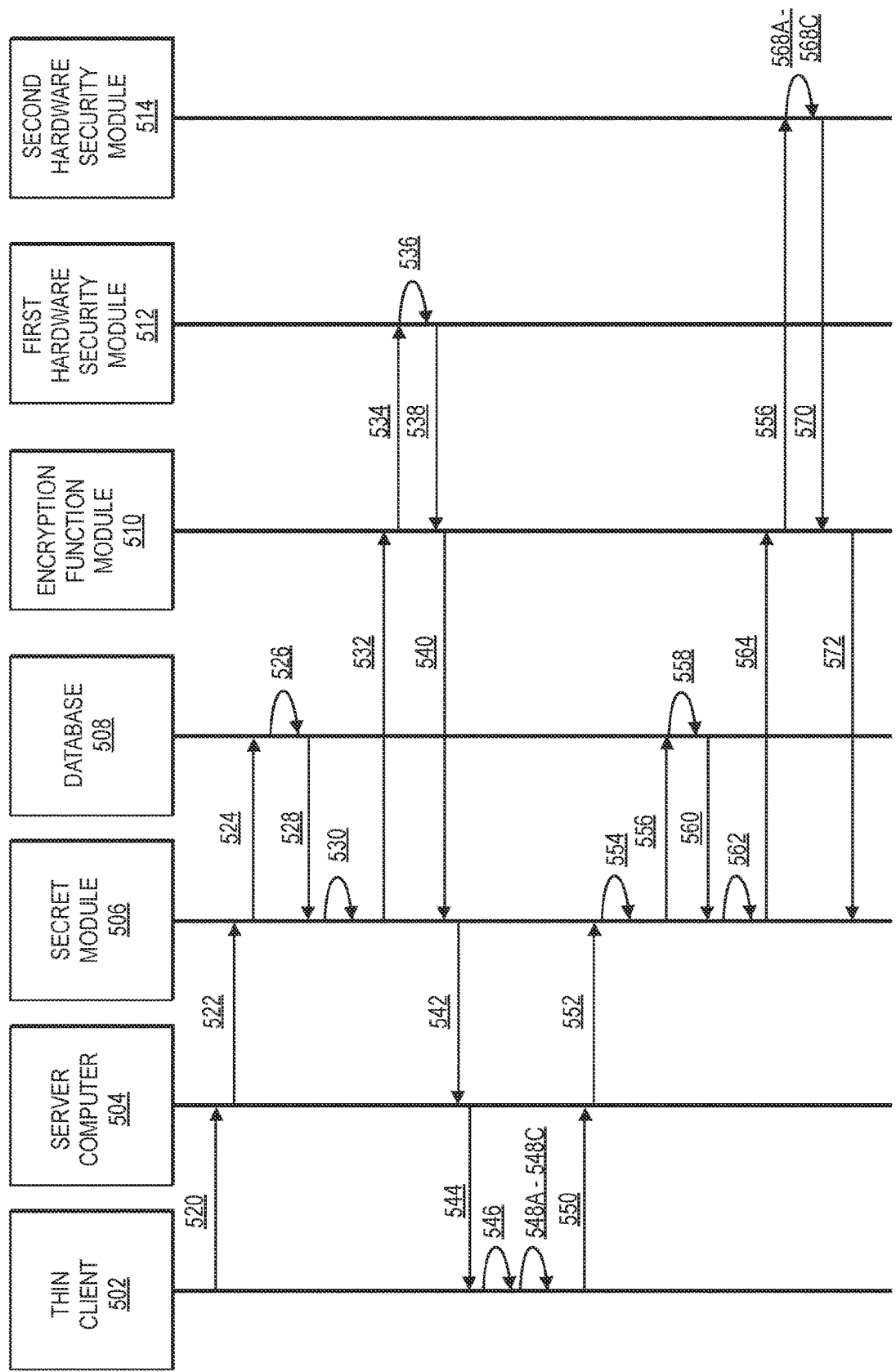
FIGS. 5A-5B shows a flow diagram illustrating an online PIN card holder verification method and PIN key refresh process according to embodiments.
Figure 5B:
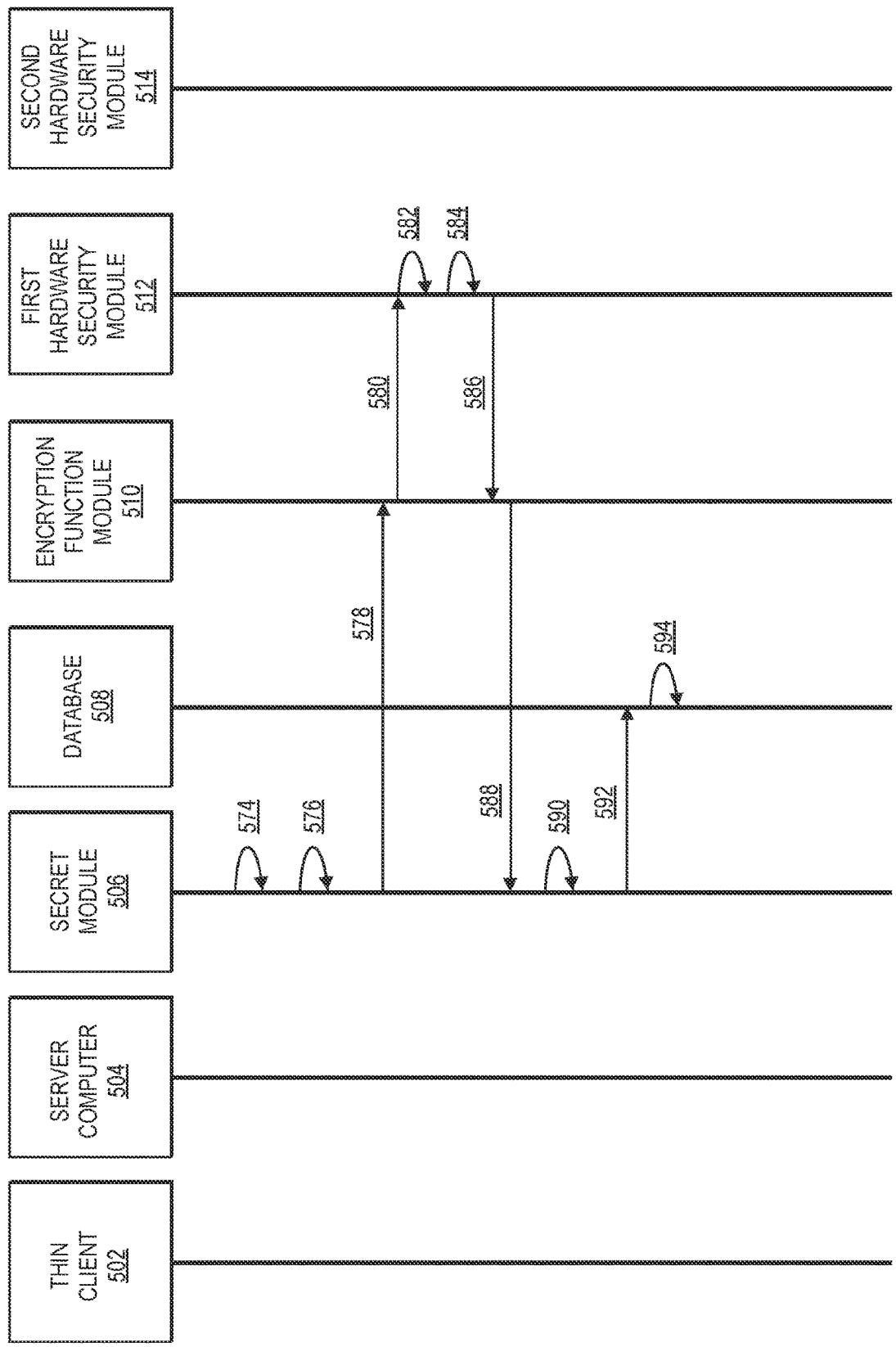

FIGS. 5A-5B. shows an online PIN card holder verification method and PIN key refresh process according to embodiments. The method illustrated in FIGS. 5A-5B will be described in the context of a user initiating an interaction with a resource provider. The user can operate a portable device. The resource provider can operate a communication device that includes a thin client 502. The portable device can provide interaction data to the communication device. Upon receiving an indication that an interaction has been initiated, the thin client 502 can communicate with a server computer 504 to process the interaction at step 520. It is understood, however, that the invention can be applied to other circumstances.

At step 520, the thin client 502 can provide an interaction request message to the server computer 504. The interaction request message includes a issued thin client identifier (VAC_device_id). The interaction request message can also include interaction data received from and/or generated by the thin client 502 for the interaction between the user and the resource provider. The issued thin client identifier can be an identifier that was previously issued to the thin client 502 by the server computer 504 or subsystems thereof.

At step 522, after receiving the interaction request message from the thin client 502, the server computer 504 can provide the issued thin client identifier to the secret module 506. The server computer 504 can provide the issued thin client identifier to the secret module 506 in a cryptographic key request message. For example, the server computer 504 can request a cryptographic key from the secret module 506 that can be provided to the thin client 502 for the thin client 502 to encrypt a secret.

At steps 524, after receiving the cryptographic key request message including the issued thin client identifier from the server computer 504, the secret module 506 can provide the cryptographic key request message to a database 508.

At step 526, after receiving the cryptographic key request message, the database 508 can obtain an encrypted first cryptographic key, which is encrypted with a second cryptographic key, ({K_Pin}K_KPIN_ENC) and a server computer ephemeral public key ($K_{VAC\text{-}PIN\text{-}PUB}$). The database 508 can obtain the encrypted first cryptographic key via any suitable lookup procedure. The database 508 can identify the encrypted first cryptographic key using the issued thin client identifier. The database 508 can obtain the server computer ephemeral public key by identifying the most recent server computer ephemeral public key in the database 508. In some embodiments, the second cryptographic key can be a session key.

At step 528, after obtaining the encrypted first cryptographic key and the server computer ephemeral public key the database 508 can provide the encrypted first cryptographic key and the server computer ephemeral public key to the secret module 506.

At step 530, after receiving the encrypted first cryptographic key and the server computer ephemeral public key from the database 508, the secret module 506 can generate a secure message generation request message. The secure message generation request message can include the encrypted first cryptographic key. The encrypted first cryptographic key is encrypted with the second cryptographic key. In some embodiments, the secure message generation request message can include the signing key (K_mac) and the sensitive data key (K_key). The secure message generation request message can request that a security hardware module (HSM), in particular a first hardware security module 512, generate a secure message that includes the first cryptographic key and is to be sent to the thin client 502. The secure message can be in a JWS_JWE format and may be created and/or formatted according to the signing key and the sensitive data key.

At step 532, after creating the secure message generation request message, the secret module 506 can provide the secure message generation request message to an encryption function module 510.

At step 534, after receiving the secure message generation request message, the encryption function module 510 can provide the secure message generation request message to the first hardware security module 512. The message may request that the encrypted first cryptographic key be sent to the thin client 502 in a secure message.

At step 536, after receiving the secure message generation request message, the first hardware security module 512 can generate the secure message. The secure message can include the encrypted first cryptographic key that is encrypted with the second cryptographic key. In some embodiments, the secure message can also include the server computer ephemeral public key ($K_{VAC\text{-}PIN\text{-}PUB}$) and/or any other suitable data. For example, the secure message can be in a JSON Web Signature_JSON Web Encryption (JWS_JWE) format and can be denoted as (JWS_JWE ({K_Pin}K_KPIN_ENC)).

At step 538, after generating the secure message, the first hardware security module 512 can provide the secure message to the encryption function module.

At step 540, after receiving the secure message, the encryption function module 510 can provide the secure message to the secret module 506.

At step 542, the secret module 506 can provide the secure message comprising the encrypted first cryptographic key to the server computer 504 in response to the cryptographic key request message.

At step 544, after receiving the secure message from the secret module 506, the server computer 504 can provide the secure message to the thin client 502.

At step 546, after receiving the secure message from the server computer 504, the thin client 502 can verify the secure message. For example, if the secure message is in a JWS_JWE format, then the thin client 502 can verify a JWE and JWS token.

At step 548A, after verifying the secure message, the thin client 502 can decrypt the encrypted first cryptographic key. For example, the thin client 502 can derive the second cryptographic key and decrypt the encrypted first cryptographic key using the second cryptographic key. The thin client 502 can derive the second cryptographic key using elliptic curve Diffie Helman cryptography (ECDH). The thin client 502 can determine the second cryptographic key based on the thin client static private key ($K_{D\text{-}ENC\text{-}PVT}$), the server computer ephemeral public key ($K_{VAC\text{-}PIN\text{-}PUB}$), an initialization vector ($IV_{pin}$) maintained by the thin client, which is incremented after each interaction, and the issued thin client identifier (VAC_device_id). To do so, the thin client 502 can generate the same shared secret (Z) as was generated at the first hardware security module 512 at step 460 of FIG. 4A. The thin client 502 can generate the shared secret (Z) based on the thin client static private key ($K_{D\text{-}ENC\text{-}PVT}$), the server computer ephemeral public key ($K_{VAC\text{-}PIN\text{-}PUB}$). For example, the thin client can compute Z=ECDH ($K_{D\text{-}ENC\text{-}PVT}$, $K_{VAC\text{-}PIN\text{-}PUB}$).

After determining the shared secret, the thin client 502 can derive the second cryptographic key using the shared secret, the initialization vector, and the issued thin client identifier. For example, the thin client 502 can derive the second cryptographic key similar to how the first hardware security module 512 derived the second cryptographic key. The thin client 502 can determine a hashed-based message authentication code (HMAC). The HMAC can have three inputs that include a key input (K), a hash function input (HF), and a message input (M). The thin client 502 can determine the hashed-based message authentication code of the shared secret (Z) used as a key input (K), a SHA-256 hash function used as a hash function input (HF), and the issued thin client identifier (VAC_device_id) as a message input (M). The HMAC can be set equal to a concatenation of the second cryptographic key, which is to be determined, and the initialization vector. The thin client 502 can determine the second cryptographic key that, when concatenated with the initialization vector, equals the HMAC. For example, the thin client 502 can derive the second cryptographic key using K_KPIN_ENC (128 bits)||$IV_{pin}$ (96 bits)= HMAC [K: Z, HF: SHA-256, M: VAC_device_id].

At step 548B, the thin client 502 can obtain a secret from the user of the portable device, who is interacting with the resource provider of the communication device. For example, the thin client 502 can prompt, on the screen of the communication device, the user to input a secret. The user can input the secret using any input elements on the communication device. For example, the user can use a touch screen with displayed buttons to input a secret. The secret can be, for example, the user's biometric template, a password, a personal identification number, a social security number, a one-time password, etc.

At step 548C, after obtaining the secret, the thin client 502 can encrypt the secret with the first cryptographic key.

At step 550, after encrypting the secret with the first cryptographic key, the thin client 502 provides the encrypted first cryptographic key to the server computer 504.

At step 552, after receiving the encrypted secret, the server computer 504 can provide a request to translate the secret to the secret module 506. The request to translate the secret (e.g., a translation request message) includes the encrypted secret and the issued thin client identifier.

At step 554, after receiving the translation request message from the server computer 504, the secret module 506 can generate a translation parameter request message comprising the issued thin client identifier. The translation parameter request message can request parameters associated with translating the encrypted secret from a first encrypted domain (e.g., encrypted with the first cryptographic key) to a second encrypted domain (e.g., encrypted with a third cryptographic key). The third encrypted key can be a transport computer or acquirer computer key (or other downstream entity) that can encrypt data as it is transorted to that entity.

At step 556, after generating the translation parameter request message, the secret module 506 can provide the translation parameter request message to the database 508.

At step 558, after receiving the translation parameter request message from the secret module 506, the database 508 can obtain the translation parameters. For example, the database 508 can look up the translation parameters using the issued thin client identifier. The translation parameters can include the encrypted first cryptographic key, an initialization vector (IV), a transport computer identifier, the second cryptographic key, a base derivation key identifier, an interaction counter, and a derivation identifier.

At step 560, after obtaining the translation parameters, the database 508 can provide the translation parameters to the secret module 506 in response to the translation request message.

At step 562, after receiving the translation parameters from the database 508, the secret module 506 can modify the translation request message (or create a similar message) to include one or more translation parameters. For example, the secret module 506 can modify the translation request message to include the secret encrypted with the first cryptographic key, the encrypted first cryptographic key that is encrypted with the second cryptographic key, the transport computer identifier, the initialization vector, the base derivation key identifier, the interaction counter, the derivation identifier, and the issued thin client identifier.

At step 564, after modifying the translation request message, the secret module 506 can provide the translation request message to the encryption function module 510.

At step 566, after receiving the translation request message from the secret module 506, the encryption function module 510 can provide the translation request message to a second hardware security module 514. In some embodiments, the encryption function module 510 can determine which hardware security module to provide the message to based on the contents of the message, the format of the message, and/or an identifier included in the message.

At step 568A, after receiving the translation request message from the encryption function module 510, the second hardware security module 514 can decrypt the encrypted first cryptographic key. The second hardware security module 514 can decrypt the encrypted first cryptographic key using the second cryptographic key to obtain the first cryptographic key.

At step 568B, after obtaining the first cryptographic key, the second hardware security module 514 can decrypt the encrypted secret using the first cryptographic key.

At step 568C, the second hardware security module 514 can encrypt the secret with a third cryptographic key (e.g., a transport computer cryptographic key). The second hardware security module 514 can obtain the third cryptographic key from memory using the transport computer identifier, which may be stored in association with the transport computer cryptographic key. The third cryptographic key can be a symmetric key.

At step 570, after encrypting the secret with the third cryptographic key, the second hardware security module 514 can provide the encrypted secret to the encryption function module 510.

At step 572, after receiving the encrypted secret, which is encrypted with the third cryptographic key, the encryption function module 510 can provide the encrypted secret to the secret module 506.

After step 572 of FIG. 5A and prior to step 574 of FIG. 5B, the secret module 506 may transmit the encrypted secret to a transport computer (not shown). The transport computer can process the encrypted secret by decrypting the encrypted secret using the third cryptographic key stored by the transport computer, as described herein. The transport computer may re-encrypt the secret with an authorizing entity computer cryptographic key and transmit the encrypted secret to an authorizing entity computer for authorization of the interaction associated with the secret.

FIG. 5B illustrates updating the cryptographic keys after processing the encrypted secret and providing the encrypted secret to a transport computer. At step 574, the secret module 506 can update one or more translation parameters. Updating the one or more translation parameters can include incrementing the one or more translation parameters. For example, the secret module 506 can increment the interaction counter. The interaction counter can be increment by a value of 1 (or other predetermined increment) after each performed interaction (e.g., after each time the process illustrated in FIG. 5A is performed). The secret module 506 can increment the initialization vector. For example, the secret module 506 can increment the initialization vector, which can be a 96 bit value, by 1 or other predetermined increment.

At step 576, after incrementing the one or more translation parameters, the secret module 506 can generate a cryptographic key refresh message. The cryptographic key refresh message comprises the encrypted first cryptographic key, which is encrypted with the second cryptographic key, the updated initialization vector, the base derivation key identifier, the updated interaction counter, the derivation identifier, the issued thin client identifier, and the second cryptographic key.

At step 578, after generating the cryptographic key refresh message, the secret module 506 can provide the cryptographic key refresh message to the encryption function module 510.

At step 580, after receiving the cryptographic key refresh message from the secret module 506, the encryption function module 510 can provide the cryptographic key refresh message to the first hardware security module 512.

At step 582, the first hardware security module 512 can generate an updated first cryptographic key using at least the updated interaction counter. The first hardware security module 512 can generate the updated first cryptographic key in a similar manner to generating the first cryptographic key and will not be repeated here.

At step 584, after generating the updated first cryptographic key, the first hardware security module 512 can encrypt the updated first cryptographic key with the second cryptographic key using the updated initialization vector.

At step 586, after encrypting the updated first cryptographic key, the first hardware security module 512 provides the encrypted updated first cryptographic key to the encryption function module 510.

At step 588, after receiving the encrypted updated first cryptographic key, the encryption function module 510 provides the encrypted updated first cryptographic key to the secret module 506.

At step 590, after receiving the encrypted updated first cryptographic key in response to the cryptographic key refresh message, the secret module 506 can generate a storage request message comprising the issued thin client identifier, the encrypted updated first cryptographic key, the updated interaction counter, and the updated initialization vector.

At step 592, after generating the storage request message, the secret module 506 can provide the storage request message to the database 508.

At step 594, after receiving the storage request message, the database 508 can store the issued thin client identifier, the encrypted updated first cryptographic key, the updated interaction counter, and the updated initialization vector in association with one another in the database 508. The issued thin client identifier, the encrypted updated first cryptographic key, the updated interaction counter, and the updated initialization vector can later be recalled during a future interaction by the database 508.

Tables of abbreviations, terms, notations, and references are provided below.

TABLE 1

Abbreviations

| Abbreviation | Description |
| --- | --- |
| AES | Advanced Encryption Standard |
| BDK | Base Derivation Key |
| COTS | Commercial Off-the-shelf |
| CVM | Card holder Verification Method |
| DAS | Device Attestation Service |
| DUKPT | Derived Unique Key Per Transaction |
| ECB | Electronic Code Book |
| ECDH | Elliptic Curve Diffie Helman |
| GCM | Galois Counter Mode |
| HMAC | Hashed-based Message Authentication Code |
| HSM | Hardware Secure Module |
| IV | Initialization Vector |
| KDF | Key Derivation Function |
| KiC | Kernel in the Cloud |
| PCI | Payment Card Industry |
| PIN | Personal Identification Number |
| SPOC | Software Based PIN Entry on COTS |
| TC | Thin Client |
| VAC | Visa Acceptance Cloud |

TABLE 2

Terms and Notations

| Terms and Notations | Descriptions |
| --- | --- |
| AES_GCM [K:, PT:, IV:, AAD:] = CT ‖ Auth_TAG | Encryption using AES in GCM mode with PT as plaintext, K as key, IV as initialization vector, and AAD as additional authenticated data. The result of the encryption in GCM mode is a cipher text CT, and an Auth_Tag that represents the integrity of PT and AAD. |
| 3DES_ECB [K:, PT:] = CT | Encryption using 3DES in ECB mode with PT as plaintext, K as key. For this mode, IV is initialized to 0. |
| HMAC[HF, K, M] | HMAC operation using HF: hash function, K: session key, over the message M. |
| A ‖ B | Message A is concatenated with B |
| Payshield HSM | HSM or hardware security module which is used for payment specific cryptographic operations. |

TABLE 2-continued

Terms and Notations

| Terms and Notations | Descriptions |
|---|---|
| Nshield HSM | A general HSM which is used for general cryptographic operations. |
| Derivation_id | The rightmost 32-bit of VAC_device_id. One of the parameters used to derive a key based on DUKPT method. |
| Interaction_counter | A counter associated with the number of times the secret is captured on TC. This counter is 0 at the time of enrollment and is incremented each time a new key is derived to encrypt the captured secret. |
| $IV_{pin}$ | Initialization Vector that is used to encrypt K_PIN with K_KPIN_ENC |
| VAC_device_id | A 128-bit unique identifier assigned to TC upon successful profile enrollment. This is referred to as an issued thin client identifier. |
| BDK_id | A unique identifier that indicates which BDK is .used for PIN translation (BDK is unique for each transport computer). |
| Acq_id | A unique identifier assigned to each transport computer upon onboarding their master key for PIN translation. |

TABLE 3

Cryptographic Key Notations

| Key notation or name | Type and length | Usage and lifecycle |
|---|---|---|
| K_acq: transport computer master key | Varies for each transport computer and can be based on the format of the secret. The secret can be in a block format. K_PIN is 128-bit 3DES key. | Secret translation inside HSM. |
| K_PIN: PIN Encryption Key | Depends on secret Block Format. If format 1 is supported, K_PIN is 128-bit 3DES-ECB | Encrypt the PIN per interaction. Used only once for each secret encryption. |
| K_mac | 256-bit used for HMAC | A signing key used for signing interaction payloads in form of JWS (HMAC with SHA-256) |
| K_key | 128-bit AES-GCM | A sensitive data key used for confidentiality protection of sensitive data |
| K_enc | 128-bit AES-GCM | An interaction payload key used for confidentiality protection of interaction payloads |
| K_KPIN_ENC | 128-bit AES-GCM | A second cryptographic key used for confidentiality protection of secret Encryption Key: K_PIN_vac |
| BDK | 128-bit 3DES | Base Derivation Key used for DUKPT algorithm. This key is unique per transport computer. |
| $K_{D\text{-}ENC\text{-}PUB}$ | 256-bit ECC public key | TC's static public key used for negotiating a session key (K_KPIN_ENC) to protect K_PIN between server computer backend and TC. |

TABLE 3-continued

Cryptographic Key Notations

| Key notation or name | Type and length | Usage and lifecycle |
| --- | --- | --- |
| $K_{D\text{-}ENC\text{-}PVT}$ | 256-bit ECC private key | TC's static private key used for negotiating a session key (K_KPIN_ENC) to protect K_PIN between server computer backend and TC. |
| $K_{VAC\text{-}PIN\text{-}PVT}$ | 256-bit ECC private key | Server computer ephemeral private key used for negotiating a session key (K_KPIN_ENC) to protect K_PIN between server computer backend and TC. |
| $K_{VAC\text{-}PIN\text{-}PUB}$ | 256-bit ECC public key | Server computer ephemeral public key used for negotiating a session key (K_KPIN_ENC) to protect K_PIN between server computer backend and TC. |

TABLE 4

References

| [VAC-TC-Sec] | Kernel-in-the-Cloud Device Authentication and Security, Conceptual Architecture, V1.5 |
| --- | --- |
| [EMVG2] | EMV $2^{nd}$ Generation Specifications, Books 1-17 |
| [PCI-SPOC] | Payment Card Industry (PCI) Software Based PIN Entry on COTS (SPOC), Program Guide, Version 1.0, April 2018. |
| [VTS-DAS] | F9537 Device Attestation Service, DMPD Solution Architecture, version 0.5, January 2019 |
| [DUKPT] | Derived Unique Key per Transaction, Retail Financial Services Symmetric Key Management, ANSI x.9.24-3-2016 |
| [FIPS-198] | FEDERAL INFORMATION PROCESSING STANDARDS PUBLICATION, The Keyed-hash Message Authentication Code (HMAC) |

Embodiments of the disclosure have a number of advantages. For example, embodiments allow for secure online communication of a secret during an interaction. Embodiments provide for the advantage of accepting a user's secret at a communication device operated by a resource provider. For example, the user can input a secret, such as a personal identification number, into the resource provider's communication device. The secret is kept secure from the resource provider even though the secret is entered into the resource provider's device and provided over the air (e.g., online) to a server computer.

Embodiments allow for secure provisioning of the first cryptographic key to the thin client from the server computer. The first cryptographic key is encrypted during transit with a second cryptographic key that is derivable from a Diffie Helman shared secret, which is derivable by the thin client. This provides for the advantage of limiting the access of the first cryptographic key to malicious parties during communications, which is beneficial because the secret will be encrypted with the first cryptographic key.

Furthermore, embodiments securely provide rotating cryptographic keys to the thin client on the communication device. For example, during each subsequent interaction, the thin client can receive the encrypted updated first cryptographic key. This provides for the advantage of limited malicious party activity if a cryptographic were to be compromised. For example, if a malicious party intercepted the encrypted first cryptographic key and were able to crack the encryption, the malicious party would only obtain information for that single interaction. The malicious party would not be able to perform malicious interactions because the first cryptographic key is updated after each interaction. Thus, the malicious party could not perform malicious interactions using the stolen first cryptographic key.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a server computer, a thin client identifier from a thin client on a communication device;
   retrieving, by the server computer, an encrypted first cryptographic key based on the thin client identifier, wherein the encrypted first cryptographic key is a first cryptographic key that is encrypted with a second cryptographic key;
   initiating, by the server computer, sending of the encrypted first cryptographic key to the thin client;
   receiving, by the server computer, an encrypted secret from the thin client, the encrypted secret being a secret encrypted with the first cryptographic key;
   decrypting, by the server computer, the encrypted secret with the first cryptographic key to obtain the secret;
   encrypting, by the server computer, the secret using a third cryptographic key, wherein the third cryptographic key is a transport computer cryptographic key; and
   providing, by the server computer, the secret encrypted with the third cryptographic key to a transport computer in an authorization request message, and wherein the transport computer decrypts the secret encrypted with the third cryptographic key to obtain the secret, encrypts the secret with an authorizing entity computer cryptographic key, and modifies the authorization request message to include the secret encrypted with the authorizing entity computer cryptographic key and provides the modified authorization request message to an authorizing entity computer, wherein the authorizing entity computer decrypts the secret encrypted with the authorizing entity computer cryptographic key using the authorizing entity computer cryptographic key, determines whether or not to authorize an interaction associated with the secret, generates an indication of whether or not the interaction is authorized, generates an authorization response message including the indication of whether or not the interaction is authorized, and provides the authorization response message to the server computer via the transport computer;
   receiving, by the server computer, the authorization response message; and
   providing, by the server computer, the authorization response message to the thin client.

2. The method of claim 1, wherein the communication device is a mobile phone.

3. The method of claim 2, wherein the first cryptographic key, the second cryptographic key, and the third cryptographic key are symmetric keys.

4. The method of claim 1, wherein the secret is a user's biometric template, a password, a personal identification number, a social security number, or a one-time password.

5. The method of claim 1, wherein the thin client receives the encrypted first cryptographic key, decrypts the encrypted first cryptographic key, obtains the secret, and encrypts the secret with the first cryptographic key.

6. The method of claim 1, wherein the second cryptographic key is independently derived by the thin client and is used by the thin client to decrypt the encrypted first cryptographic key.

7. The method of claim 1, wherein the second cryptographic key is independently derived by the thin client and is used by the thin client to decrypt the encrypted first cryptographic key, wherein the second cryptographic key is independently derived using an initialization vector, the thin client identifier, and a shared secret, the shared secret obtained by the thin client using a Diffie-Hellman Elliptic Curve cryptographic process.

8. The method of claim 1 further comprising:
   receiving, by the server computer, interaction data from the thin client, during an initial interaction between a user of a portable device and a resource provider of the communication device; and
   providing, by the server computer, the interaction data along with the encrypted secret to the transport computer.

9. The method of claim 1 wherein the transport computer is an acquirer computer.

10. The method of claim 1, wherein the thin client is software on the communication device.

11. The method of claim 1, wherein the authorization request message comprises a primary account number and a transaction amount.

12. The method of claim 1, wherein the authorizing entity computer is an issuer computer.

13. The method of claim 1, wherein the secret is a PIN.

14. A server computer comprising:
   a processor; and
   a computer-readable medium coupled to the processor, the computer-readable medium comprising code executable by the processor for implementing a method comprising
   receiving a thin client identifier from a thin client on a communication device, retrieving an encrypted first cryptographic key based on the thin client identifier, wherein the encrypted first cryptographic key is a first cryptographic key that is encrypted with a second cryptographic key, initiating sending of the encrypted first cryptographic key to the thin client, receiving an encrypted secret from the thin client, the encrypted secret being a secret encrypted with the first cryptographic key, decrypting the encrypted secret with the first cryptographic key to obtain the secret, encrypting the secret using a third cryptographic key, wherein the third cryptographic key is a transport computer cryptographic key, and providing the secret encrypted with the third cryptographic key to a transport computer in an authorization request message, and wherein the transport computer decrypts the secret encrypted with the third cryptographic key to obtain the secret, encrypts the secret with an authorizing entity computer cryptographic key, and modifies the authorization request message to include the secret encrypted with the authorizing entity computer cryptographic key and provides the modified authorization request message to an authorizing entity computer, wherein the authorizing entity computer decrypts the secret encrypted with the authorizing entity computer cryptographic key using the authorizing entity computer cryptographic key, determines whether or not to authorize an interaction associated with the secret, generates an indication of whether or not the interaction is authorized, generates an authorization response message including the indication of whether or not the interaction is authorized, and provides the authorization response message to the server computer via the transport computer, receiving the authorization response message, and providing, by the server computer, the authorization response message to the thin client.

15. The server computer of claim 14 further comprising:
a secret module;
an encryption function module;
a first hardware security module; and
a second hardware security module.

16. The server computer of claim 15, further comprising:
providing, by the server computer, the secret encrypted with the first cryptographic key and the thin client identifier to the secret module;
querying, by the secret module, a database for translation parameters using the thin client identifier;
receiving, by the secret module, the translation parameters; and
providing, by the secret module, the secret encrypted with the first cryptographic key and the translation parameters to the second hardware security module via the encryption function module,
wherein decrypting the secret encrypted with the first cryptographic key is performed using the translation parameters and in the second hardware secure module,
wherein encrypting the secret with the third cryptographic key is performed in the second hardware security module,
wherein the second hardware security module provides the secret encrypted with the third cryptographic key to the secret module via the encryption function module, and
wherein the secret module provides the secret encrypted with the third cryptographic key to the server computer.

17. The server computer of claim 16, wherein the translation parameters include the encrypted first cryptographic key, an initialization vector, a transport computer identifier, the second cryptographic key, a base derivation key identifier, an interaction counter, and a derivation identifier.

18. The server computer of claim 16, wherein after providing, by the second hardware security module, the secret encrypted with the third cryptographic key to the secret module via the encryption function module, the method further comprises:
providing, by the secret module, a refresh request message to the first hardware security module via the encryption function module;
generating, by the first hardware security module, an updated first cryptographic key;
encrypting, by the first hardware security module, the updated first cryptographic key with the second cryptographic key;
providing, by the first hardware security module, the encrypted updated first cryptographic key to the secret module via the encryption function module; and
storing, by the secret module, the thin client identifier and the encrypted updated first cryptographic key in the database.

19. The server computer of claim 14 prior to receiving the thin client identifier from the thin client, the method further comprises:
assigning, by the server computer, the thin client identifier to the thin client.

20. The server computer of claim 14, wherein prior to receiving the thin client identifier from the thin client the method further comprises:
receiving a public key request from the thin client, wherein the public key request comprises a request for a server computer ephemeral public key;
obtaining the server computer ephemeral public key; and
providing the server computer ephemeral public key to the thin client, wherein the thin client derives the second cryptographic key from at least the server computer ephemeral public key.

* * * * *